United States Patent [19]

Tanaka et al.

[11] Patent Number: 5,818,429

[45] Date of Patent: Oct. 6, 1998

[54] COORDINATES INPUT APPARATUS AND ITS METHOD

[75] Inventors: Atsushi Tanaka, Yamato; Yuichiro Yoshimura, Kamakura; Ryozo Yanagisawa, Inzai; Katsuyuki Kobayashi, Yokohama; Masaki Tokioka, Fujisawa; Hajime Sato, Yokohama, all of Japan

[73] Assignee: Canon Kabushiki Kaisha, Tokyo, Japan

[21] Appl. No.: 706,571

[22] Filed: Sep. 5, 1996

[30] Foreign Application Priority Data

Sep. 6, 1995 [JP] Japan .................................. 7-229017
Sep. 13, 1995 [JP] Japan .................................. 7-235332

[51] Int. Cl.$^6$ ........................................................ G09G 5/00
[52] U.S. Cl. ........................................ 345/173; 345/179
[58] Field of Search .................................... 345/173, 174, 345/175, 176, 177, 178, 179, 180, 182, 183, 104; 178/18, 19

[56] References Cited

U.S. PATENT DOCUMENTS

| | | | |
|---|---|---|---|
| 4,886,943 | 12/1989 | Suzuki et al. .............................. | 178/18 |
| 4,910,363 | 3/1990 | Kobayashi et al. ....................... | 178/18 |
| 4,931,965 | 6/1990 | Kaneko et al. ........................... | 364/560 |
| 5,017,913 | 5/1991 | Kaneko et al. ........................... | 340/712 |
| 5,073,685 | 12/1991 | Kobayashi et al. ...................... | 345/177 |
| 5,239,138 | 8/1993 | Kobayashi et al. ....................... | 178/18 |
| 5,500,492 | 3/1996 | Kobayashi et al. ....................... | 178/18 |
| 5,539,678 | 7/1996 | Tanaka et al. ........................... | 364/561 |
| 5,565,893 | 10/1996 | Sato et al. ............................... | 345/177 |

FOREIGN PATENT DOCUMENTS 5-62771  9/1993  Japan .
6-83520  3/1994  Japan .

*Primary Examiner*—Xiao Wu
*Attorney, Agent, or Firm*—Fitzpatrick, Cella, Harper & Scinto

[57] ABSTRACT

Coordinates input apparatus and method which can accurately calculate a coordinate position by two vibration sensors are provided. The occurrence of a vibration of an input pen is controlled by at least two kinds of forms. At least two vibration sensors each for detecting the vibration from the input pen are provided. On the basis of the time until the vibration of each form arrives every vibration sensor, the distance from the input position of the input pen is calculated every vibration of each form. A difference between the distances calculated every vibration of each form which is calculated is calculated every vibration sensor.

8 Claims, 13 Drawing Sheets

| f1 \ f0 | +λ0 | 0 | −λ0 |
|---|---|---|---|
| +λ1 | λ0−λ1 | −λ1 | −λ0−λ1 |
| 0 | λ0 | 0 | −λ0 |
| −λ1 | λ0+λ1 | λ1 | −λ0+λ1 |

800

COORDINATES INPUT APPARATUS AND ITS METHOD

BACKGROUND OF THE INVENTION

1. Field of the Invention

The invention relates to coordinates input apparatus and method for inputting coordinates by giving a vibration from an input pen onto a vibration propagating plate.

2. Related Background Art

According to a coordinates input apparatus for detecting a vibration of a supersonic wave or the like which is generated from a vibration input pen and for calculating the position of coordinates instructed by the vibration input pen, the position of the coordinates is calculated on the basis of a delay time of a vibration wave which is propagated on a tablet serving as an input surface. In case of such a coordinates input apparatus, since devices such as matrix-like wirings or the like are not installed on the tablet, a cheap apparatus can be provided. Moreover, if a transparent plate glass is used as a tablet, a coordinates input apparatus having a high transparency as compared with the other systems can be constructed.

As an example of the coordinates input apparatuses as mentioned above, there is an apparatus as disclosed in Japanese Patent Publication No. 5-62771. According to such a coordinates input apparatus, a group delay time of a plate wave that is propagated on a vibration propagating plate and a phase delay time are measured and a distance between the position at which the vibration was given and each sensor for detecting the vibration is calculated, thereby obtaining the position (coordinates) at which the vibration was given. When calculating the distance, although a high precision is derived by calculating the distance on the basis of the phase delay time, by considering a fact that the phase delay time has a discontinuity, an approximate distance is first calculated from the group delay time and a region where the phase delay time has a continuity is specified by using the result of the distance calculation, thereby calculating such a distance.

An outline of a procedure for detecting the coordinates will now be described with reference to FIG. 2.

FIG. 1 is a diagram showing a construction of a conventional coordinates input apparatus.

Reference numeral 1 denotes a controller comprising: a microcomputer for controlling the whole coordinates input apparatus; an internal counter (not shown); an ROM (not shown) in which programs such as an operating procedure and the like have been stored; an RAM which is used as a temporary shunt area of data, a work area, or the like; a non-volatile memory to store constants or the like; and the like.

The controller 1 drives a display driver 10 on the basis of coordinates (position information) which are instructed by a vibration input pen 3, thereby controlling a display of the coordinates by a display 11, or outputs the coordinates through a line (not shown) to an external apparatus which is connected to the line. Further, when a start signal is inputted, a time counting operation is started by a counter, vibration detection timings by vibration sensors 6a to 6d are synchronized, and delay times until the vibration is detected by the vibration sensors 6a to 6d is measured.

Reference numeral 2 denotes a vibrator driver for vibrating a pen tip in the vibration input pen 3. Reference numeral 8 denotes a vibration propagating plate made of an acrylic plate, a glass plate, or the like. The coordinates inputting operation by the vibration input pen 3 is performed by touching the vibration propagating plate 8. Further, actually, the coordinates inputting operation is performed by a method whereby a point in an area A shown by a solid line in the diagram (hereinafter, such an area is referred to as an effective area) is designated by the vibration input pen 3. A damping material 7 to prevent (reduce) that the reflected vibration is returned to the center portion is provided around an outer periphery of the vibration propagating plate 8. The vibration sensors 6a to 6d such as piezoelectric elements or the like each for converting a mechanical vibration into an electric signal are fixed at corner boundary positions between them, respectively.

Reference numeral 9 denotes a signal waveform detector for outputting the signal obtained by detecting the vibration by each of the vibration sensors 6a to 6d and converting into the electric signal to the controller 1. The signal waveform detector 9 is constructed by a band pass filter (not shown), an envelope detector (not shown), a double differentiator (not shown), and a pre-amplifier (not shown). Reference numeral 11 denotes the display comprising a liquid crystal display or the like which can display on a dot unit basis. The display 11 is arranged behind the vibration propagating plate 8. Reference numeral 10 denotes the display driver for displaying a dot position as a position inputted by the vibration input pen 3 onto the display 11. The dots displayed on the display can be seen by looking through the vibration propagating plate 8.

A vibrator 4 built in the vibration input pen 3 is driven by the vibrator driver 2. A drive signal of the vibrator 4 is supplied as a pulse signal at the low level from the controller 1 and is amplified by the vibrator driver 2 by a predetermined gain. After that, the signal is supplied to the vibrator 4.

The electric drive signal is converted into a mechanical supersonic vibration by the vibrator 4 and is propagated to the vibration propagating plate 8 through a pen tip 5.

A vibrating frequency of the vibrator 4 is selected to a value at which a plate wave can be generated to the vibration propagating plate 8 such as a glass or the like. When the vibrator 4 is driven, a mode in which a vertical vibration is applied to the vibration propagating plate 8 is selected. By setting the vibrating frequency of the vibrator 4 to a resonant frequency including the pen tip 5, an efficient vibration conversion can be performed. Further, an elastic wave which is propagated to the vibration propagating plate 8 is a plate wave and has an advantage such that it is difficult to be influenced by a scratch of the surface of the vibration propagating plate, an obstacle, or the like as compared with a surface acoustic wave or the like.

A principle such that vibration arriving times which are required until the vibration from the vibration input pen 3 arrives at the vibration sensors 6a to 6d through the vibration propagating plate 8 is calculated by using the coordinates input apparatus constructed as mentioned above will now be described.

As for a velocity of the vibration which propagates from the vibration input pen 3 to each of the vibration sensors 6a to 6d, a velocity at which a vibration group that propagates as a Lamb wave progresses (such a velocity is referred to as Vg) is different from a velocity at which a phase progresses (hereinafter, such a velocity is referred to as Vp). For example, when times which are required when the vibration from the vibration input pen 3 arrives at the vibration sensor 6a at the velocities (Vg, Vp) are set to tg and tp, respectively, a distance d to the vibration sensor 6a is given as follows.

$$d = Vg \cdot tg \tag{1}$$

Although the above equation relates to one (vibration sensor 6a) of the vibration sensors 6a to 6d, the distances between the other three vibration sensors 6b to 6d and the vibration input pen 3 can be also similarly expressed by the same equation.

Further, when the process based on the detection of the phase velocity is executed in order to decide the coordinates at a higher precision, the distance d between the vibration sensor 6a and the vibration input pen 3 is obtained as follows.

$$d = n \cdot \lambda p + Vp \cdot tp \quad (2)$$

where, $\lambda p$ denotes a wavelength of an elastic wave and n indicates an integer.

From the equations (1) and (2), the integer n is expressed as follows.

$$n = INT[(Vg \cdot tg - Vp \cdot tp)/\lambda p + 1/N] \quad (3)$$

where, N is a real number other than "0" and a proper value is used. For example, now assuming that N =2, so long as there is a fluctuation of tg or the like within a range of ±½ wavelength, n can be determined.

By substituting "n" obtained as mentioned above into the equation (2), the distance between the vibration input pen 3 and the vibration sensor 6a can be accurately measured by using a phase delay time tp which has a high precision although it is discontinuous.

In the calculation of "n" in the above equation (3), however, when an error occurs (hereinafter, referred to as an "n"—error) and "n" has a wrong value, an error that is integer times as large as the wavelength occurs in the distance calculation.

In Japanese Patent Application Laid-Open No. 63-015989, the occurrence of such an error is detected by using a geometrical calculation as shown in FIG. 10 on the basis of the arrangement of the vibration sensors.

FIG. 10 is a diagram for explaining the error detecting method disclosed in Japanese Patent Application Laid-Open No. 63-015989.

As shown in the diagram, an origin of the coordinates is set to O, a distance between the vibration sensors 6a and 6b is set to X, and a distance between the vibration sensors 6a and 6c is set to Y.

Now, assuming that target coordinates is set to P(x, y), on the basis of tp and tg which are respectively detected by the vibration sensors 6a and 6b, when the equations (1) and (2) are applied and the distances between coordinates P and the vibration sensors 6a and 6b are set to da and db, an x coordinate is obtained as follows by the theorem of three squares.

$$x = (da^2 - db^2)/2X \quad (4)$$

On the other hand, on the basis of tp and tg which are respectively detected by the vibration sensors 6a and 6c, by applying the equations (1) and (2), now assuming that distances between the coordinates P and the vibration sensors 6a and 6c are set to da and dc, a y coordinate is obtained as follows by the theorem of three squares.

$$y = (da^2 - dc^2)/2Y \quad (5)$$

The distance to each of the vibration sensors 6a to 6d is calculated by the calculated coordinates and is compared with the distance of each of the vibration sensors 6a to 6d obtained by the equation (2). When a difference between them doesn't exceed a predetermined value, the calculated coordinates are outputted. When the difference between them exceeds the predetermined value, for example, in FIG. 2, when an error of a y coordinate y' which is calculated by the vibration sensors 6a and 6c in FIG. 2 is included and the x coordinate which is calculated by the vibration sensors 6a and 6b is equal to x, as shown in the diagram, coordinates P' (x, y') are calculated as a coordinate position. In such a case, therefore, the output of the coordinates is stopped.

However, for example, when the coordinates are calculated by using two vibration sensors, the error judgment cannot be performed. There is a problem such that the coordinates including an error are outputted according to circumstances.

The invention is made in consideration of the above problems and it is an object of the invention to provide coordinates input apparatus and method which can accurately calculate a coordinate position by two vibration sensors.

When three or more vibration sensors are provided as mentioned above, since a redundant (not always necessary) vibration sensor exists, the occurrence of the error can be judged as mentioned above. However, when only two vibration sensors are provided (for example, in case of using only the vibration sensors 6a and 6b), since the judgment about the occurrence of the error as mentioned above cannot be performed, there is a problem such that the coordinate values including the error are outputted as they are.

The invention is made in consideration of the above problem and it is an object of the invention to provide coordinates input apparatus and method which can suppress the fetching of an error.

In association with the above objects, it is an object of the invention to provide coordinates input apparatus and method which can detect the occurrence of an error even in case of using no redundant vibration sensor.

In association with the above objects, it is an object of the invention to provide coordinates input apparatus and method which can correct an error when the occurrence of the error is detected.

SUMMARY OF THE INVENTION

According to an embodiment of the invention, there is provided a coordinates input apparatus for inputting coordinates by giving a vibration from an input pen onto a vibration propagating plate, comprising: drive control means for controlling a generation of the vibration of the input pen in at least two kinds of forms; at least two detecting means for detecting the vibration from the input pen; first calculating means for calculating a distance from an input position of the input pen every vibration of each form on the basis of a time during which the vibration of each form arrives every detecting means; and second calculating means for calculating, every detecting means, a difference between the distances calculated every vibration of each form which are calculated by the first calculating means.

DETAILED DESCRIPTION OF THE PREFERRED EMBODIMENTS

[First Embodiment of the Invention]

Figure 1:
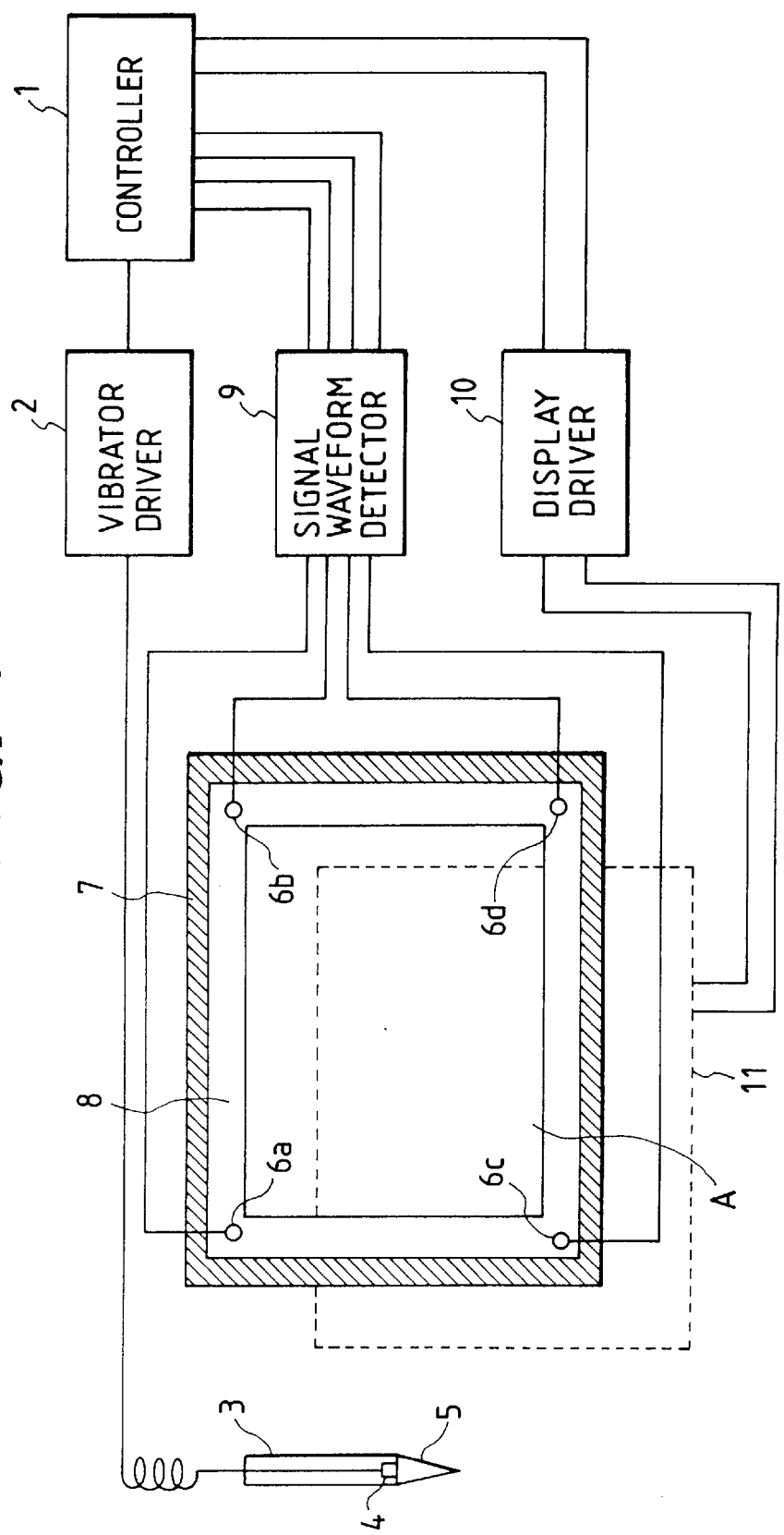
FIG. 1 is a block diagram showing a constructional example of a coordinates input apparatus according to prior art.

The preferred first embodiment of the invention will now be described hereinbelow with reference to the drawings. The structure of a coordinates input apparatus used in this embodiment is similar to that of FIG. 1. In the diagram, the controller 1 supplies a pulse signal to the vibrator driver 2 at every predetermined period. The vibrator driver 2 amplifies the pulse signal at a predetermined amplification factor and supplies the drive signal to the vibrator 4 of the vibration input pen 3. The vibrator 4 converts the drive signal into a mechanical supersonic vibration. In this instance, the drive signal is controlled so that the vibrator 4 generates a supersonic vibration including two kinds of frequency components which can be separately detected.

The vibration propagating plate 8 is a vibration propagating plate to propagate the inputted supersonic vibration to the vibration sensors 6a to 6d and is made of a transparent material such as acrylic plate, glass plate, or the like. The input of the supersonic vibration by the vibration input pen 3 is executed by making the pen tip 5 which is vibrated by the vibrator 4 contact with a predetermined position in the input area A on the vibration propagating plate 8.

Figure 2:
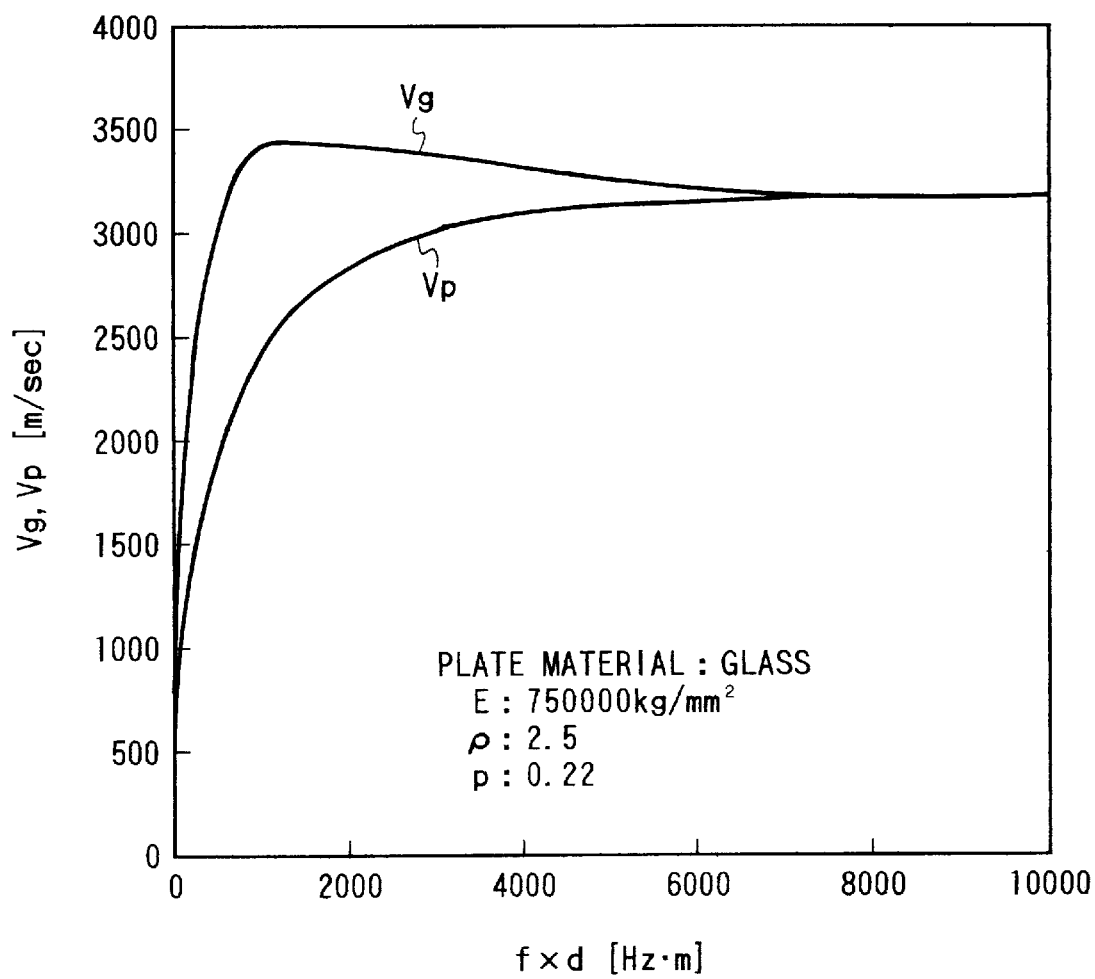
FIG. 2 is a diagram showing an f·d curve of a plate wave.

The inputted supersonic vibration propagates as a plate wave and is delayed in accordance with a propagating distance and reaches each of the vibration sensors 6a to 6d. As shown in FIG. 2, a propagating velocity of the supersonic vibration depends on the product of a vibrating frequency f and the plate thickness d of the vibration propagating plate 8. Therefore, when the plate thickness d is constant, the propagating velocity (group velocity Vg, phase velocity Vp) depends on the frequency f. In the embodiment, by paying attention to such a nature, the supersonic vibrations at two frequencies (they are referred to as f0 and f1) are detected and a group delay time and a phase delay time of each vibration are measured, thereby judging the occurrence of an error.

The signal waveform detector 9 detects the arrival of the supersonic vibrations of two kinds of frequencies, executes processes, which will be explained hereinafter, and outputs timing signals (Tg, Tp) indicative of arrival timings of the supersonic vibrations to the controller 1. The timing signals (Tg, Tp) are generated with respect to each of the four vibration sensors 6a to 6d.

The controller 1 has therein a timer circuit and activates the timer circuit at a timing to output the foregoing pulse signal (which is generated at every predetermined period) to the vibrator driver 2. The controller 1 detects each of the timing signals [as many as (4 sensors × 2 frequencies) with respect to Tg and Tp] indicating that the supersonic vibrations reach the vibration sensors 6a to 6d, thereby obtaining the group delay times tg and phase delay times tp for the two kinds of frequencies with respect to the four vibration sensors 6a to 6d from count values. The controller 1 compares the distances from the input coordinates of the vibration to the vibration sensors 6a to 6d which were measured and calculated at each frequency (hereinafter, such distances are also referred to as proper propagation distances), thereby judging the presence or absence of an error. As a result of the judgment, if the error lies within an allowable range, the input coordinates of the vibration is calculated and outputted. An output form of the coordinates is decided in accordance with the embodiment. For example, the coordinates can be outputted to the display driver 10 or can be also outputted to an external apparatus or memory device (not shown) and the coordinate data can be also inputted to them.

The display driver 10 drives and controls the display 11 on the basis of the data of the inputted coordinates so as to, for example, display dots or the like at the corresponding positions or the like.

The damping material 7 to suppress that the reflected supersonic vibration is returned to the center portion is provided for the outer periphery of the vibration propagating plate 8. The vibration sensors 6a to 6d such as piezoelectric elements or the like each for converting the mechanical vibration into the electric signal are arranged in the boundary between the vibration propagating plate 8 and the damping material 7.

<Constructional example of the signal waveform detector>

Figure 3:
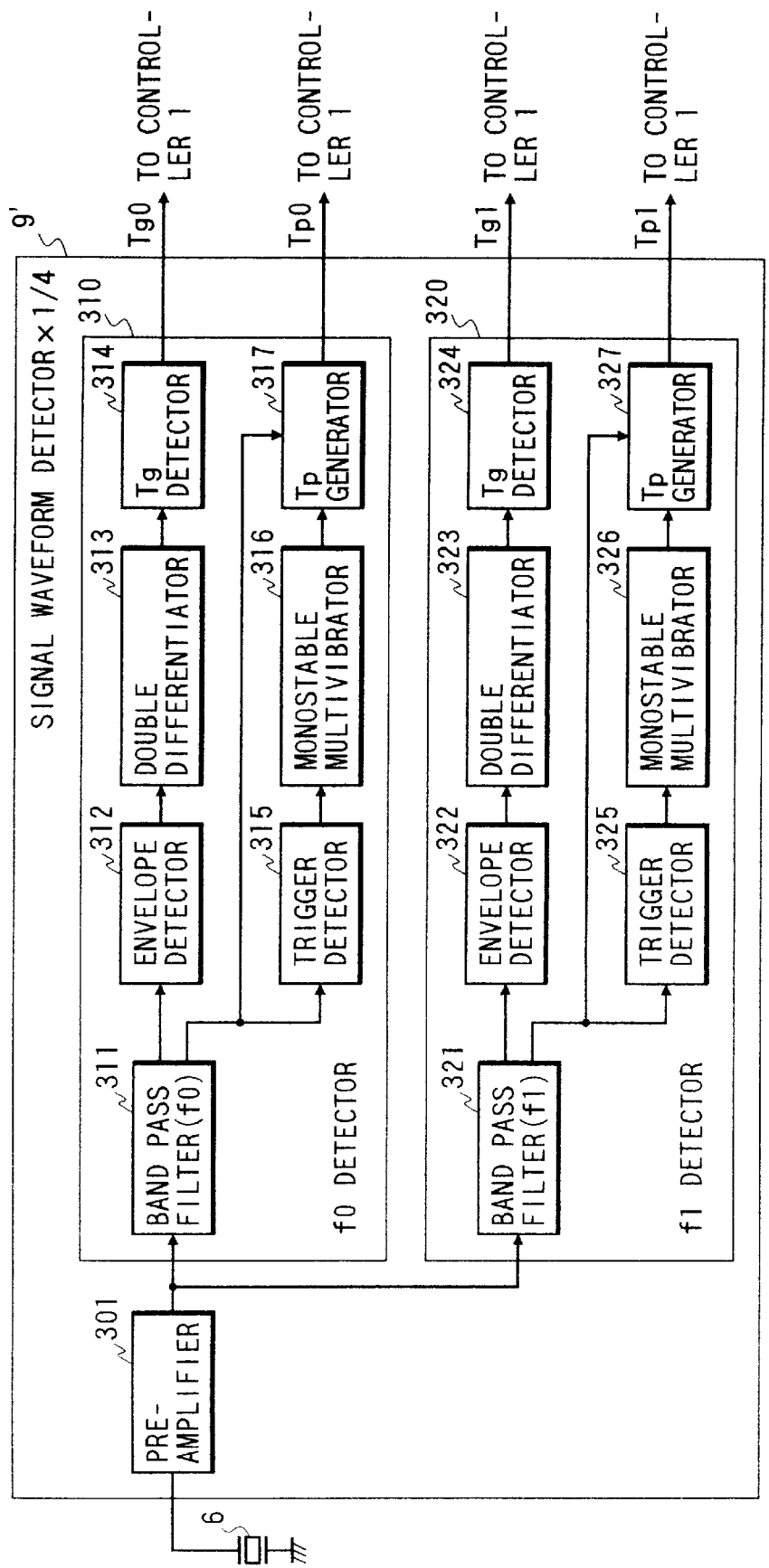
FIG. 3 is a block diagram showing a constructional example of a signal waveform detector according to the present invention.

FIG. 3 is a block diagram showing a constructional example of the signal waveform detector according to the present invention. In the diagram, reference numeral 9' denotes a circuit for detecting a signal provided in correspondence to each vibration sensor 6 (6a–6d). The signal waveform detector 9 includes the circuits 9' as many as the number of vibration sensors. For example, in the embodiment, since there are the four vibration sensors 6a to 6d, the signal waveform detector 9 has the four circuits 9' corresponding to the vibration sensors 6a to 6d.

Figure 4:
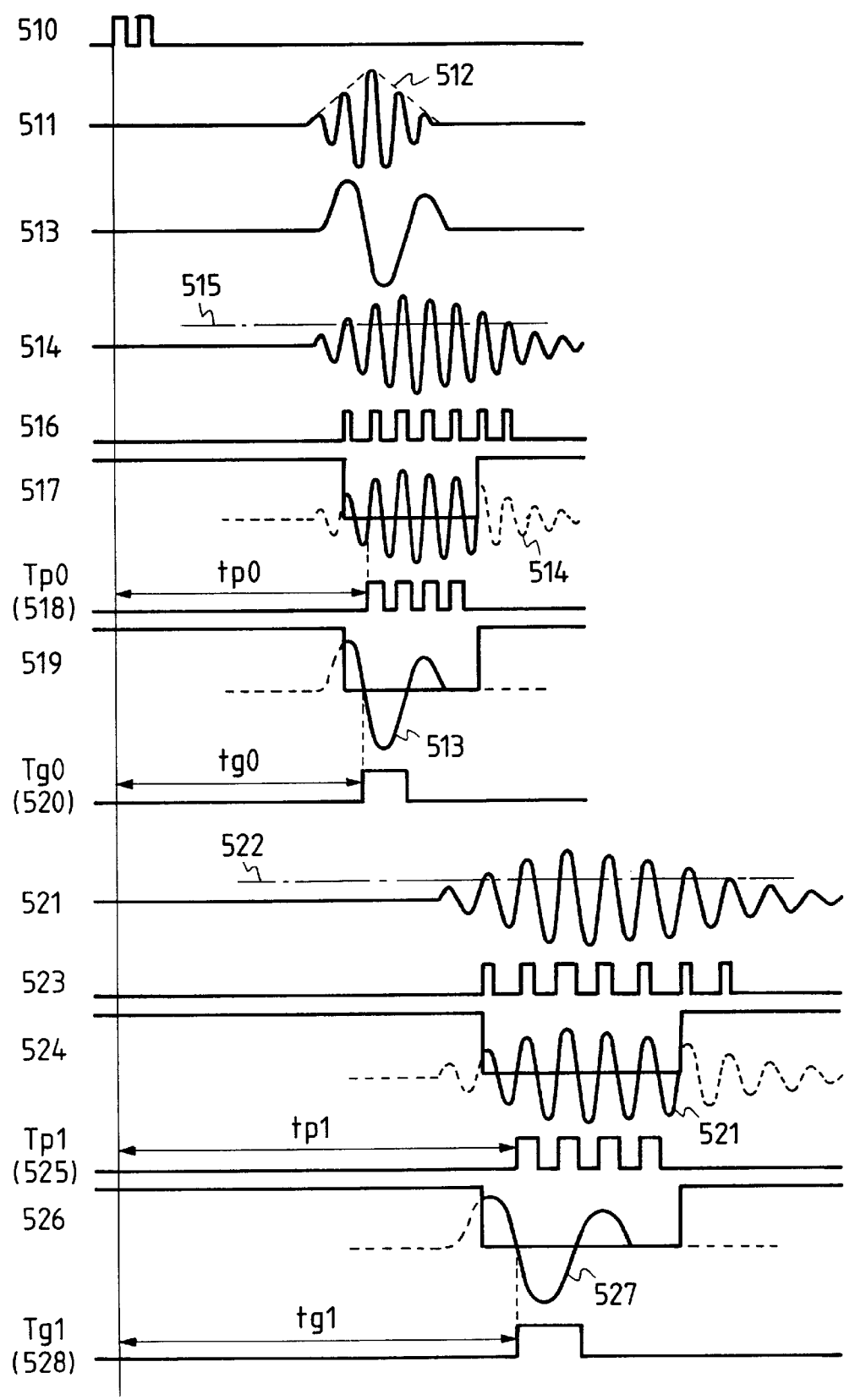
FIG. 4 is a diagram showing waveforms for explaining the operation of the signal waveform detector.

The operation of the signal waveform detector 9 will now be described with reference to signal waveforms shown in FIG. 4. The vibration input pen 3 can input a vibration at an arbitrary position on the vibration propagating plate 8 by a drive signal 510 (signal which can input vibrations of frequencies f0 and f1) which is given from the vibrator driver 2. The vibration sensor 6 converts the vibration propagated on the vibration propagating plate 8 into the electric signal and supplies to a pre-amplifier 301. The pre-amplifier 301 amplifies an output signal of the vibration sensor 6 by a predetermined amplification factor and supplies to an f0 (signal) detector 310 and an f1 (signal) detector 320.

The f0 detector 310 is a circuit for generating timing signals (Tg0, Tp0) indicative of the arrival of the vibration regarding the inputted vibration of the frequency f0. The f1 detector 320, on the other hand, is a circuit for generating timing signals (Tg1, Tp1) indicative of the arrival of the vibration regarding the inputted vibration of the frequency f1. Both of the detectors 310 and 320 have the same function except that the treating frequency differs.

A band pass filter 311 separates a signal 511 as a component regarding the inputted vibration of the frequency f0 and supplies to an envelope detector 312. The band pass filter 311 supplies a signal 514 in which further surplus frequency components have been eliminated from the signal 511 to a trigger generator 315.

The envelope detector 312 is constructed by an absolute value circuit, a low pass filter, and the like, extracts an envelope signal 512 from the signal 511 and supplies to a double differentiator 313. The double differentiator 313 is constructed by, for example, differentiators of two stages and outputs a signal 513 obtained by differentiating the envelope signal 512 twice to a Tg (signal) detector 314.

The Tg detector 314 is constructed by a monostable multivibrator or the like, forms a gate signal 519 with a predetermined time width, detects the peak of an envelope from a zero-cross point of the signal 513 for a period of time during which the gate signal 519 is at the low (L) level, and generates a signal Tg0 (signal 520) as a detection signal. As mentioned above, the controller 1 activates the built-in timer at a timing (timing of the drive signal 510) to give a pulse signal to the vibrator driver 2 and can obtain a group delay time tg0 (group delay time tg regarding the component of the frequency f0) from the count value of such an internal timer at the timing when the signal Tg0 is detected.

The trigger generator 315 forms a pulse signal 516 of a portion in which the signal 514 exceeds a threshold signal 515 at a predetermined level and supplies to a monostable multivibrator 316. The monostable multivibrator 316 forms a gate signal 517 with a predetermined time width which was triggered in response to the first leading edge of the pulse signal 516 and supplies to a Tp (signal) generator 327. The Tp generator 327 pulse converts the signal 514 for a period of time during which the gate signal 517 is at the L level and generates a signal Tp0 (signal 525) as a detection signal of the phase signal. As mentioned above, the controller 1 activates the built-in timer at the timing (timing of the drive signal 510) to give the pulse signal to the vibrator driver 2 and can obtain a phase delay time tp0 (phase delay time tp regarding the component of the frequency f0) from the count value of such an internal timer at the timing when the signal Tp0 is detected.

Explanation of the f1 detector 320 is omitted because it has the same function as that of the f0 detector 310 except that the treating frequency differs as mentioned above. Signals 521, 522, 523, 524, 525, 527, and 528 correspond to signals 514, 515, 516, 517, 518, 513, and 520, respectively (signals corresponding to the signals 511 and 512 are not shown).

<Constructional example of the controller>

Figure 5:
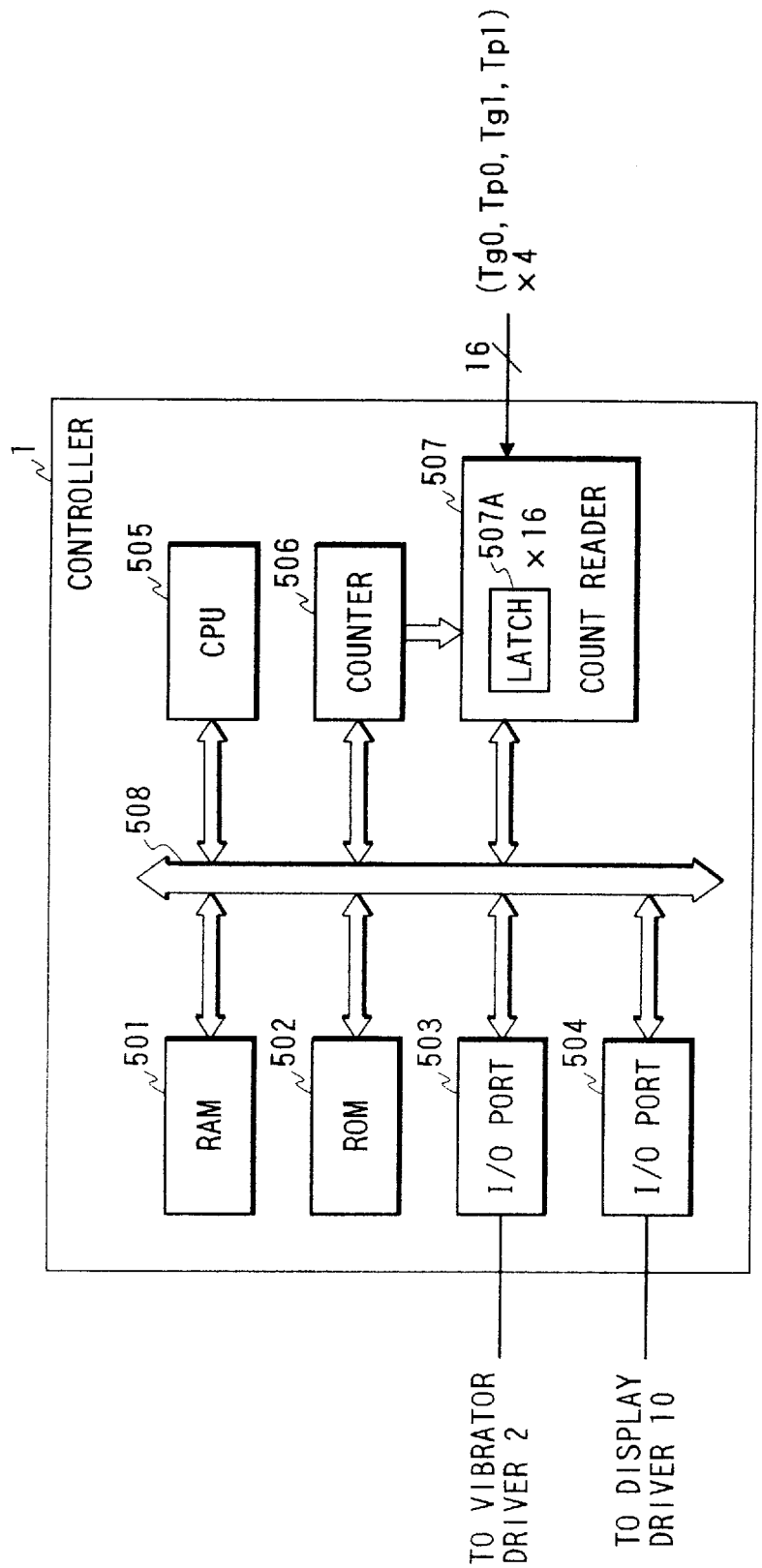
FIG. 5 is a block diagram showing a constructional example of a controller.

FIG. 5 is a block diagram showing a constructional example of the controller 1. In the diagram, an RAM 501 is a random access memory which functions as a work memory of the CPU 505. An ROM 502 is a memory in which an activation program and control programs (which will be explained herein later) to be supplied to a CPU 505 have been stored. An I/O port 503 is an input/output port to control the vibrator driver 2. An I/O port 504 is an input/output port to control the display driver 10 and an external apparatus (for example, computer) (not shown).

The CPU 505 is a microcomputer for reading out the various programs stored in the ROM 502 and for controlling the whole coordinates input apparatus. A counter 506 is activated (for example, by an activation command) at a timing to drive the vibration input pen 3 through the vibrator driver 2 and is reset at a predetermined timing. A count value is outputted to a count reader 507.

The count reader 507 is a circuit for latching a count value on the basis of the timing signal which is supplied from the signal waveform detector 9. Since the signals Tg0, Tp0, Tg1, and Tp1 (total 16 signals) regarding the four vibration sensors 6a to 6d are inputted as timing signals to the count reader 507, the count reader 507 has sixteen latches 507A in order to latch the count values corresponding to those signals. When the count reader 507 detects all of the timing signals and latches the count values, the count reader generates, for example, an interruption request to the CPU 505, thereby notifying of such a fact.

On the basis of the interruption request, the CPU 505 reads out the count values latched by the 16 latches 507A, so that it can measure vibration propagation times up to the vibration sensors at two frequencies f0 and f1, respectively.

<Measurement example of the vibration propagation time>

Figure 6:
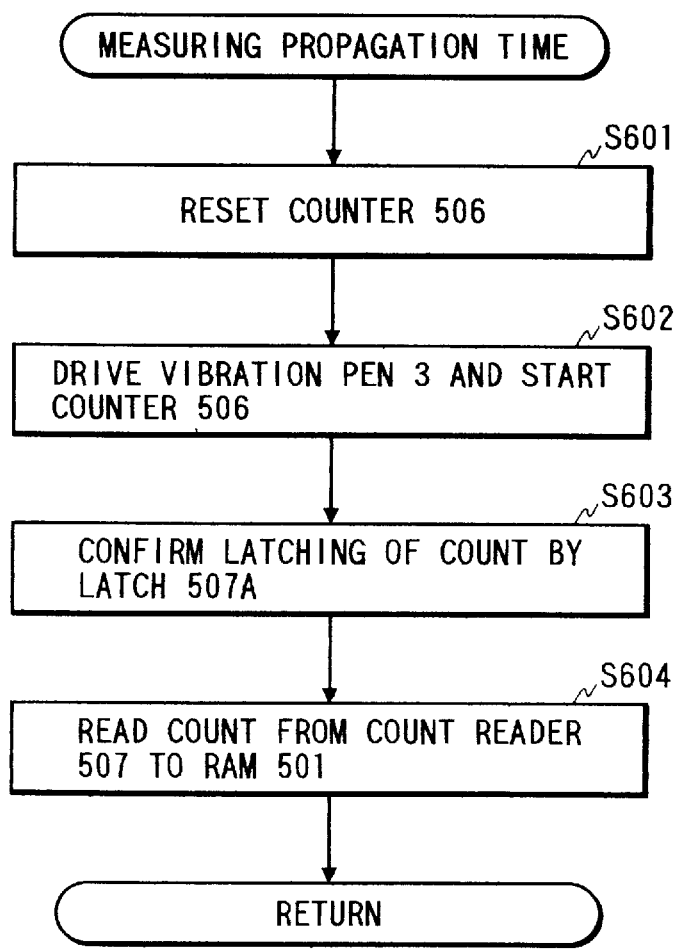
FIG. 6 is a flowchart showing a flow for a process of a measuring routine of a propagating time.

FIG. 6 is a flowchart showing a flow for processes of a measuring routine of the propagation time. The control program for such a measuring routine has been stored in the ROM 502 as mentioned above. First in step S601, the counter 506 is reset. In step S602, the vibration input pen 3 is driven by the vibrator driver 2 and the counter 506 is also activated. It is not always necessary to simultaneously perform such a driving and an activation. If there is a large time difference between the driving and the activation, it is sufficient to correct such a difference when the vibration propagation time is calculated from the count values. In step S603, the latch operation of the count value by the latch circuit 507A is confirmed by the interruption request or the like as mentioned above. In step S604, the count value is read out from the count reader 507 and is stored into the RAM 501.

Since a situation such that all of the timing signals are not properly generated due to an influence by noises or the like is also considered, a watch doc timer or the like is provided. If the interruption request or the like is not generated even after the elapse of a predetermined time, it is desirable to perform a proper error process.

<Detection example of wavelength error>

A detecting principle of a wavelength error will be first described. Now, assuming that phase delay times at two frequencies are set to tp0 and tp1 and wavelengths are set to λ0 and λ1 and phase velocities are set to vp0 and vp1, distances L0 and L1 which are measured by using the frequencies are obtained by the following equations (6) and (7).

$$L0 = n0 \cdot \lambda 0 + vp0 \cdot tp0 \qquad (6)$$

$$L1 = n1 \cdot \lambda 1 + vp1 \cdot tp1 \qquad (7)$$

When n0 and n1 are correct, L0 and L1 are equal. When at least one of n0 and n1 includes an error, however, L0≠L1 and the distance including the error has a value that is different by only the wavelength. For example, when n1 includes the error of +1, now assuming that L1 including the error is set to L1', $$L1'-L0=\lambda 1 \quad (8)$$

L1 has a value which is larger by only a value of $\lambda 1$.

When both of n0 and n1 include errors, now assuming that the error of n0 is set to $\Delta n0$ and the error of n1 is set to $\Delta n1$ and L0 including the error is set to L0', $$L0'=(n0+\Delta n0)\cdot\lambda 0+vp0\cdot tp0 \quad (9)$$

$$L1'=(n1+\Delta n1)\cdot\lambda 1+vp1\cdot tp1 \quad (10)$$

$$L0'-L1'=\Delta n0\cdot\lambda 0-\Delta n1\cdot\lambda 1 \quad (11)$$

For example, when n0 and n1 include an error of +1, since the wavelengths of them are different, L0' ≠ L1'. Therefore, when the distances obtained differ at the frequencies f0 and f1, the occurrence of a wavelength error can be detected. A condition in which both of them are equal is given by the following equation (12).

$$\Delta n0\cdot\lambda 0=\Delta n1\cdot\lambda 1 \quad (12)$$

Now assuming that a ratio of the wavelengths at the frequencies f0 and f1 is equal to 1.5 times, when $\Delta n0/\Delta n1 = 1.5$, the occurrence of an error cannot be judged. Since $\Delta n$ s given by a integer, however, the minimum combination when the ratio is equal to 1.5 times is set to 3:2, namely, when they include an error of three wavelengths and an error of two wavelengths, the occurrence of an error cannot be judged.

Under the ordinary use circumstances, since there is a wavelength error of about ±1 wavelength, by setting a plurality of frequencies so as not to set the wavelength ratio to an integer value, the errors (wavelength errors) of L0 and L1 can be judged.

Figure 7:
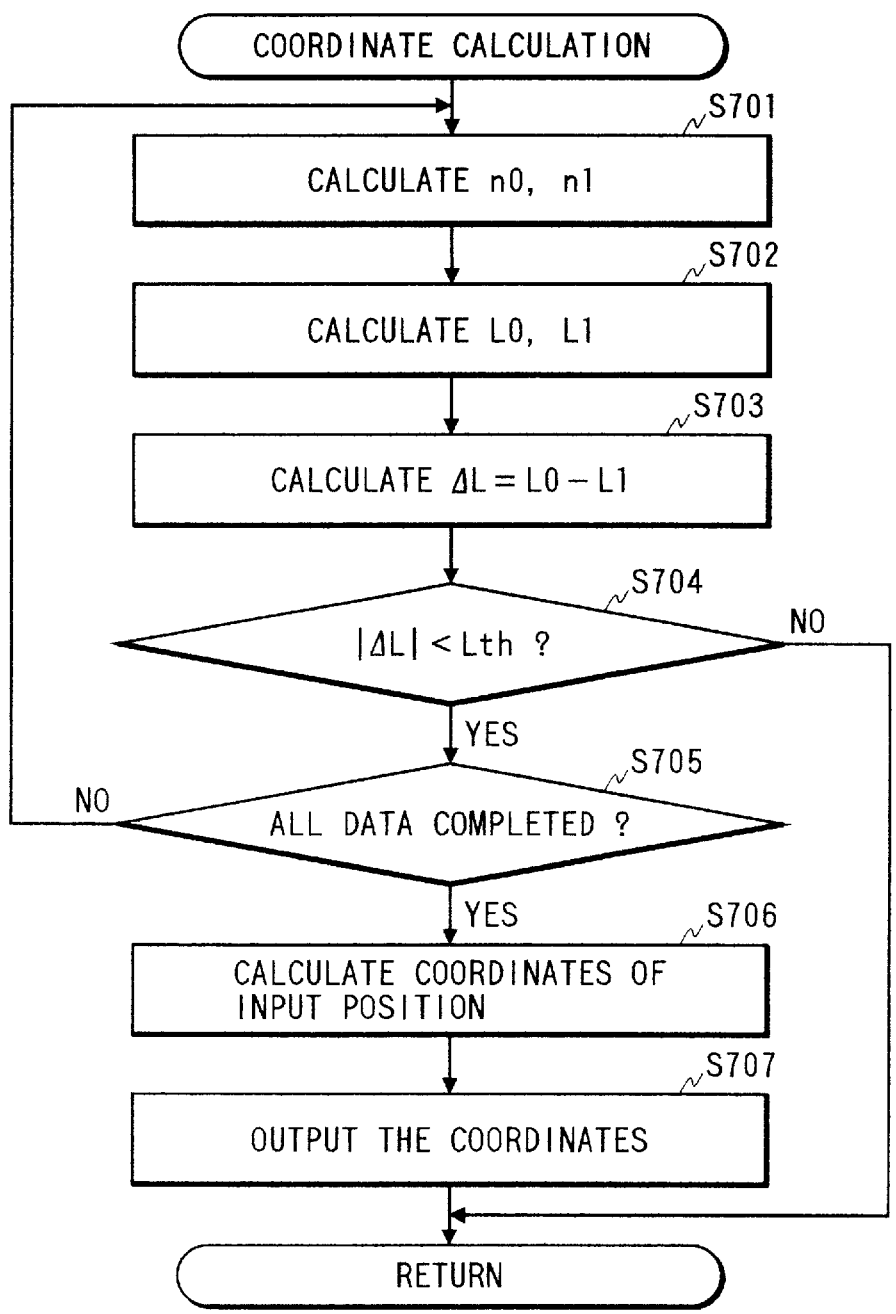
FIG. 7 is a flowchart showing a flow for a process of a calculating routine of coordinate values.

Processes for calculating inputted coordinates of the vibration while judging the presence or absence of measurement errors of the distances between the input position of the vibration and the sensors 6a to 6d on the basis of the above principle will now be described. FIG. 7 is a flowchart showing a flow for processes of a calculating routine of coordinate values. The control program for such a calculating routine has been stored in the ROM 502 as mentioned above.

First, n (n0, n1) are calculated with respect to the frequencies (f0, f1) by using the equation (3) with respect to the data (Tg0, Tp0, Tg1, Tp1) of one of the four vibration sensors 6a to 6d. In step S702, the distances (L0, L1) are calculated by using the equation (2). In step S703, a difference $\Delta L$ between the distances L0 and L1 is calculated.

In step S704, a check is made to see if the absolute value of $\Delta L$ is smaller than a predetermined threshold value Lth. Actually, since there is a rare case where the distance error is equal to 0, it is sufficient to properly decide Lth on the basis of a content amount or the like of the errors in the system. For example, by setting Lth to a value that is equal to or less than the difference between the wavelengths at both frequencies, such a judgment can be performed. As a result of the judgment, when both of those values are almost equal (there is only a difference of the threshold value Lth or less), the processing routine advances to step S705. When an error such that the absolute value of $\Delta L$ exceeds the threshold value occurs, the processing routine is finished and the vibration propagation times are again measured.

In step S705, with respect to all of the data (data regarding the sensors 6a to 6d), a check is made to see if the calculation of the distances has been finished. When there is data which is not yet calculated, the processing routine is returned to step S701 and the above processes are repeated. After completion of the calculation with respect to all of the data, step S706 follows.

When it is judged that the calculation of the distances about all of the data has been finished, the input coordinates of the vibration are calculated in step S706. In step S707, the coordinate values are supplied to the display driver 10 or an external apparatus (for example, computer) (not shown) through the I/O port 504.

As mentioned above, when vibrations of two or a plurality of frequencies are given and the distances are respectively calculated by the measured delay times and those distance values are almost equal, it is judged that there is no wavelength error, so that the coordinate calculation is executed. When each distance has a difference which is equal to or larger than the predetermined threshold value, it is judged that the wavelength error is included, so that the coordinate calculation is not performed. With this method, upon inputting the coordinates, a large error like a wavelength error is not fetched.

Different from the case where a redundant vibration sensor is provided and the distances measured by using the sensors are combined and whether an error is included in the distances or not is judged, according to the embodiment, the occurrence of an error can be judged every sensor, a limitation regarding the arrangement of the vibration sensors is lightened, and a degree of freedom in designing is also raised. For example, according to the embodiment, the wavelength error can be also detected even in the 2-sensor system.

Although the above embodiment has been shown and described with respect to the example in which the signal detection of the different frequencies is executed with respect to both of the signals Tg and Tp, for example, it is also possible to detect the signals of different frequencies with respect to only Tp and to use the same frequency with regard to Tg. In such a case, the signal waveform detector and the controller can be simplified.

The above embodiment has been shown and described with respect to the example in which the frequency components are separated by using the plurality of band pass filters (311, 321). However, it is also possible to construct in a manner such that a plurality of kinds (frequencies) of signals are used as a drive signal of the vibration input pen 3 and the vibration input pen 3 is driven while switching the frequencies of the drive signals every predetermined period and distances are measured for a plurality of periods of time. In such a case, since there is no need to measure the distances with respect to a plurality of frequency components in the same period, the construction of the signal waveform detector 9 can be simplified. For example, by omitting the f1 detector 320 and by widening a band pass width of the band pass filter 311 of the f0 detector 310, the number of component elements of the signal waveform detector 9 can be reduced into about ½.

[Second Embodiment of the Invention]

Although the above first embodiment has been shown and described with respect to the example in which whether the coordinate values are calculated or not is decided on the basis of the judgment result of the wavelength error, according to the second embodiment, on the basis of a difference between the distances measured by both frequencies, the measured distances are corrected, thereby calculating correct coordinate values.

<Correction principle of wavelength error>

Figures 8, 10:
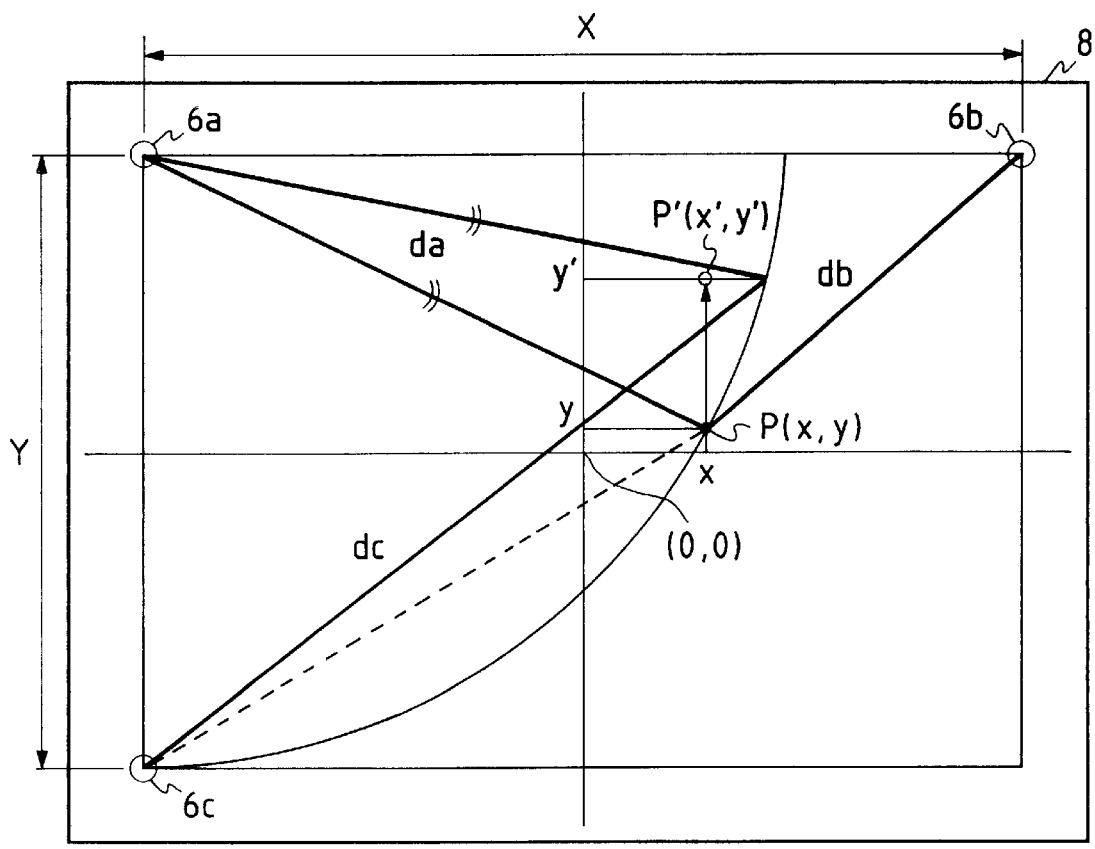
FIG. 8 is a diagram showing a conceptual construction of a differential table.
FIG. 10 is a diagram for explaining a conventional method of judging the occurrence of an error.

Ordinarily, since the wavelength error occurs within a range of ±1 wavelength, by limiting the occurrence of the wavelength error to ±1 wavelength and considering such a case, a difference between the distances measured by using the frequency components of f0 and f1 is as show in a differential table 800 shown in FIG. 8 by using λ0 and λ1. Since the values of λ0 and λ1 differ, the distance differences (for example, λ0−λ1,−λ1, etc.) have different values. Therefore, when the difference between the distances measured by using the frequencies f0 and f1 coincides with any one of the differences show in the differential table 800, the error is corrected on the basis of the differential table 800 and the correct input coordinates can be calculated.

<Correction example of wavelength error>

Figure 9:
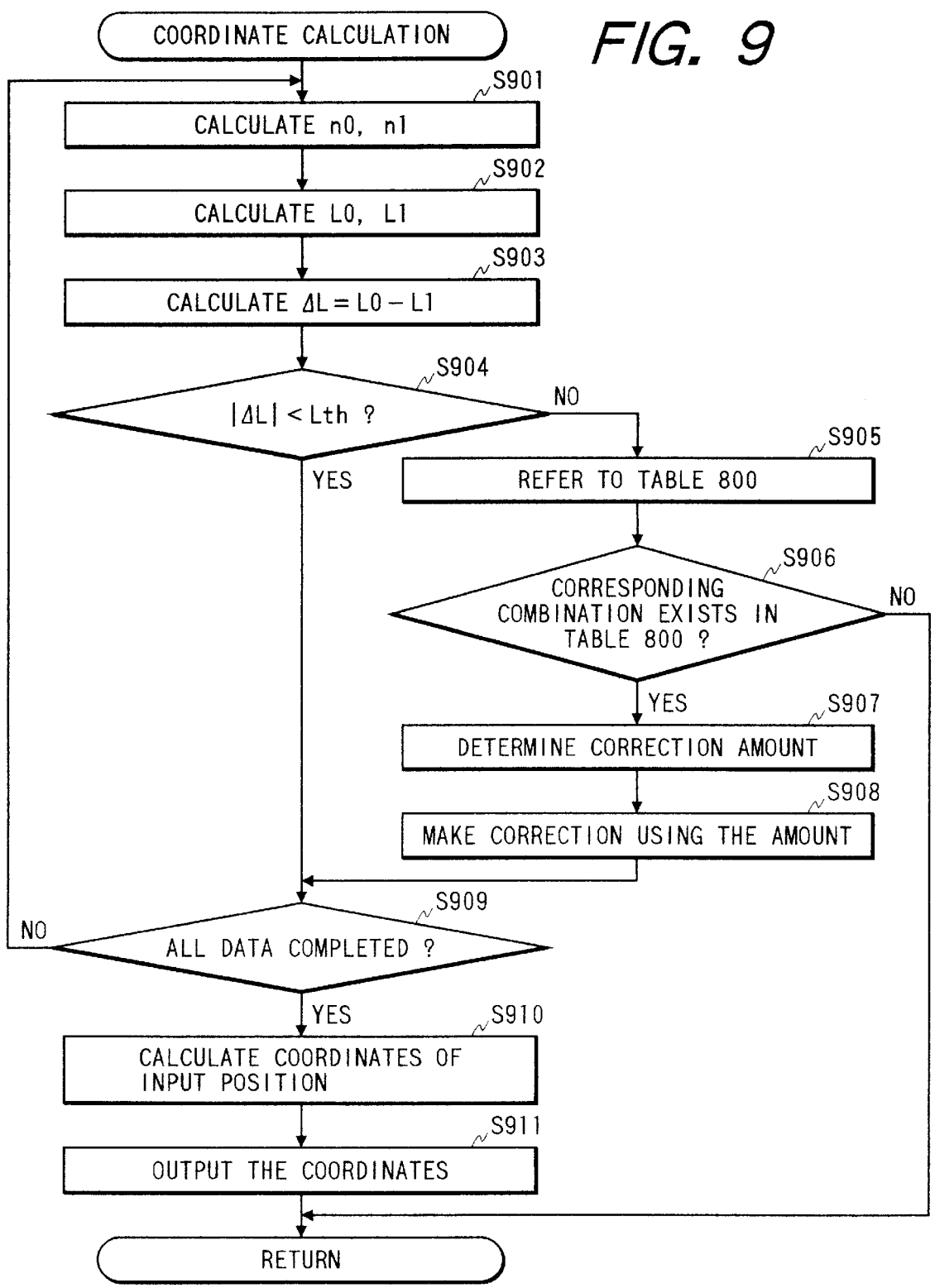
FIG. 9 is a flowchart showing a flow for a process of a routine to calculate coordinate values by correcting a peak error.

An example of a process for correcting the wavelength error on the basis of the above principle will now be described. FIG. 9 is a flowchart showing a flow of processes for a routine to correct the wavelength error and to calculate coordinate values. A control program for such a calculating routine and the differential table 800 have been stored in the ROM 502.

First in step S901, n (n0, n1) are calculated with respect to the frequencies (f0, f1) by using the equation (3) with regard to the data (Tg0, Tp0, Tg1, Tp1) of one of the four vibration sensors 6a to 6d. In step S902, the distances (L0, L1) are calculated by using the equation (2). In step S903, the difference ΔL between the distances L0 and L1 is calculated.

In step S904, a check is made to see if the absolute value of ΔL is smaller than the predetermined threshold value Lth. Since there is actually a rare case where the distance error is equal to 0, it is sufficient to properly decide Lth on the basis of a content amount or the like of the error in the system. For example, by setting Lth to a value which is equal to or less than the wavelength difference at both frequencies, such a judgment can be performed. As a result of the judgment, when they are almost equal (there is only a difference of the threshold value Lth or less), the processing routine advances to step S909. When the error exceeds the threshold value Lth, it is judged that the wavelength error is included, so that step S905 follows.

In step S905, the difference ΔL between the distances calculated is compared with the contents in the differential table 800, thereby extracting a coincident combination (for example, λ0−λ1). "Coincident" used here doesn't indicate a coincidence as a strict meaning but a judgment is made within an allowable predetermined error. In step S906, a check is made to see if any combination which coincides with ΔL exists in the differential table 800. If YES, step S907 follows. If NO, the processing routine is finished and the vibration propagation times are again measured.

In step S907, the correction amount is decided on the basis of the foregoing coincident combination. For example, when such a combination is ( λ0−λ1), the distance measured by using the frequency f0 has an error of +λ0 and the distance measured by using the frequency f1 has an error of +λ1. A correction amount to be corrected can be determined on the basis of them. In step S908, the correction is performed in accordance with the decided correction amount. The wavelength error can be corrected by only the distance (for example, L0) that is used in the calculation or the wavelength error can be also corrected by both of the distances (L0, L1) and their average value can be also used. In the embodiment, since there is a tendency such that the value at a higher frequency is more difficult to be influenced by the reflection or the like, by using the calculation result of the distance at the higher frequency, a calculating precision of the coordinates is improved. When one of the distances doesn't include the wavelength error, such a distance can be also used as it is.

In step S909, with respect to all of the data (data regarding the sensors 6a to 6d), a check is made to see if the calculation of the distances has been finished. When there is any data which is not yet calculated, the processing routine is returned to step S901 and the above processes are repeated. After completion of the calculation with respect to all of the data, step S910 follows.

In step S910, the coordinate values at which the vibration was inputted are calculated from the equations (4) and (5) by using the calculated distances. In step S911, the calculated coordinate values are supplied to the display driver 10 or an external apparatus (for example, computer) (not shown) through the I/O port 504.

According to the embodiment as mentioned above, the distances calculated by using the supersonic vibrations of the different frequencies are compared, the error can be corrected on the basis of the comparison result, a deterioration of a sampling efficiency of the coordinates by the occurrence of the error is suppressed, and the coordinates can be inputted at a high speed.

In the above embodiment, subsequent to the calculation of the distances, the wavelength error is detected and corrected. However, so long as there is a surplus calculating speed or the like, after the coordinates were calculated, the presence or absence of the wavelength error can be also judged. For example, the coordinates are calculated by using the distances measured at the frequencies and both of them are compared. When they have the same coordinate values, it is judged that no error is included. When they are different, it is judged that the error is included, so that the processes as mentioned above are executed.

Although the above embodiment has been made on the assumption that the wavelength error of ±1 wavelength is included, the invention can be also applied to a case where a wavelength error exceeding ±1 wavelength is included by properly changing the differential table, correction amount deciding process (step S907), and the like.

The invention can be applied to a system constructed by a plurality of equipment or can be also applied to a single apparatus. It will be obviously understood that the invention can be also applied to a case where the invention is embodied by supplying a program to a system or an apparatus. In such a case, a memory medium in which the programs regarding the invention have been stored constructs the invention. By reading out the programs from the memory medium and supplying to the system or apparatus, the system or apparatus operates in accordance with a predetermined method.

According to the invention as described above, there are effects such that the distances are calculated by using the supersonic vibrations of a plurality of different frequencies and the occurrence of error can be detected on the basis of the results of the distance calculation and the fetching of the error can be reduced.

There is an effect such that even in case of providing no redundant vibration sensor, the occurrence of an error can be detected.

There is also an effect such that the distances calculated by using the supersonic vibrations of a plurality of different frequencies are compared and an error can be corrected on the basis of the comparison result and the coordinates can be inputted at a high speed.

13

[Third Embodiment of the Invention]

Although the circuit construction described in the first embodiment is used in the third embodiment, the functions will now be again simply described.

<Explanation of the controller>

The controller 1 in the third embodiment generates the signal to drive the vibrator 4 in the vibration input pen 3 through the vibrator driver 2 at every predetermined period and starts the time counting operation by the internal timer (constructed by a counter). The vibration generated by the vibration input pen 3 is delayed in accordance with the distances up to the vibration sensors 6a to 6d and arrives at the vibration sensors 6a to 6d, respectively. The vibration propagates as a plate wave and two velocities of a velocity at which a group of vibrations progress (hereinafter, such a velocity is called a group velocity) and a velocity at which a phase of the vibration progresses (hereinafter, such a velocity is called a phase velocity) exist.

The waveform detector 9 detects the signals from the vibration sensors 6a to 6d, forms the signal indicative of a vibration arrival timing to each vibration sensor by a waveform detecting process, which will be explained herein later, and supplies to the controller 1. On the basis of the inputted signals, the controller 1 detects the vibration arrival times from the position designated by the vibration input pen 3 to the vibration sensors 6a to 6d, thereby calculating the coordinate position of the vibration input pen.

Figure 11A:
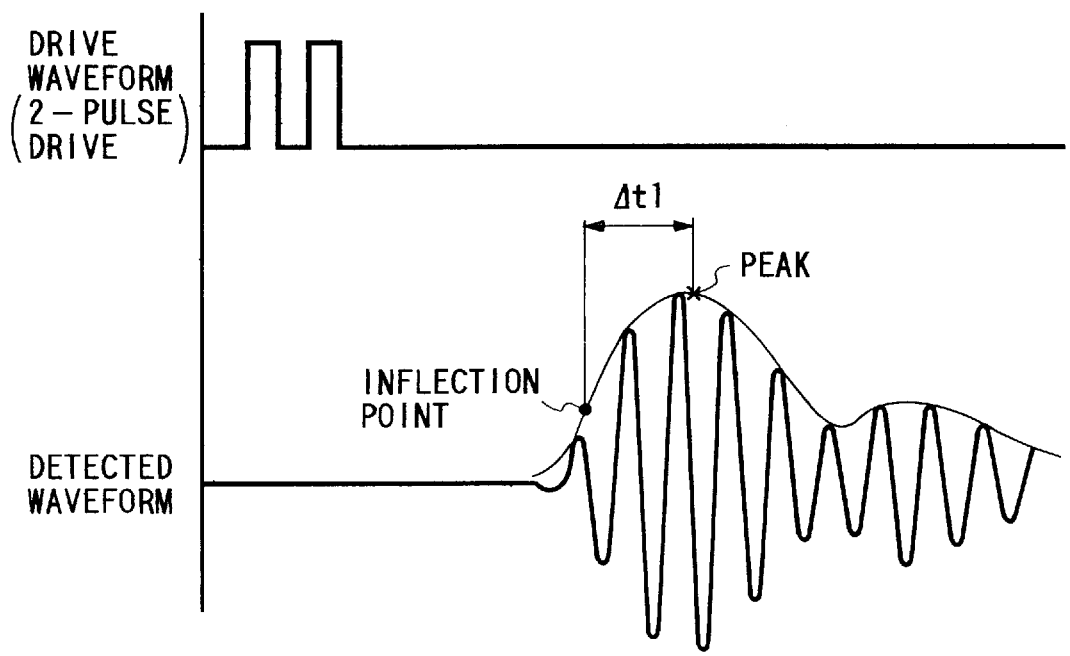
FIG. 11A is a diagram showing a drive waveform by a 2-pulse drive and a detected waveform when each of vibration sensors 6a to 6d in the 2-pulse drive detects.
Figure 11B:
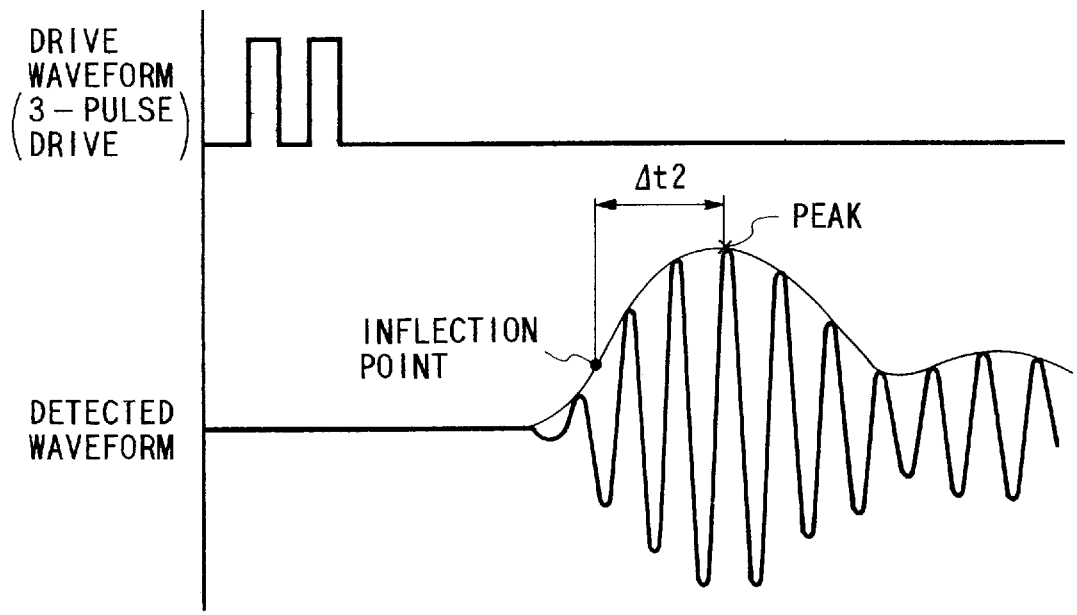
FIG. 11B is a diagram showing a drive waveform by a 3-pulse drive and a detected waveform when each of the vibration sensors 6a to 6d in the 3-pulse drive detects.

For example, FIGS. 11A and 11B show a drive waveform which is inputted to the vibrator 4 and detected waveforms when the vibration that is generated from the vibrator 4 propagates on the vibration propagating plate 8 and is detected by the vibration sensors 6a to 6d.

A frequency of the drive waveform which is inputted from the vibrator driver 2 to the vibrator 4 is set to a frequency at which the vibration is efficiently generated from the vibration input pen 3. By inputting the drive waveforms including a plurality of pulses, the vibration near a narrow band, namely, near a single frequency component is generated as a vibration which is generated from the vibrator 4. Particularly, in the propagating plate whose propagating velocity changes depending on the frequency of the drive waveform, it is desirable to form the drive waveforms including a plurality of pulses and to drive.

FIG. 11A shows a drive waveform by a 2-pulse drive and a detected waveform when it is detected by each of the vibration sensors 6a to 6d in the 2-pulse drive. FIG. 11B shows a drive waveform by a 3-pulse drive and a detected waveform when each of the vibration sensors 6a to 6d in the 3-pulse drive detects.

The drive waveform when forming the drive waveform x times (x is a integer larger than 0) is called a drive waveform of n-pulse drive hereinafter.

As show in the diagram, when the number of drive waveforms is increased, it will be understood that a time Δt2 in the 3-pulse drive of FIG. 11B in the diagram corresponding to the peak and inflection point show in FIG. 11A is longer than a time Δt1 between a certain inflection point of the detected waveform in the 2-pulse drive in FIG. 11A in the diagram and a certain peak. Namely, since there is a tendency such that the width on a time base of the detected waveform increases, a time resolution when a singular point such as inflection point, peak, or the like is detected from an envelope of the waveform deteriorates. Since an unnecessary reflected wave from the edge surface of the vibration propagating plate 8 is overlapped with a slight time delay, if a time width of the detected waveform increases, the detecting point is influenced by the reflected wave.

14

Therefore, it is desirable to form the drive waveforms up to about three times and the apparatus is designed so as to reduce the time width by filtering the detected waveform by using a band pass filter and by extracting only a single frequency component. When the drive waveform is formed once, however, even if a band pass filter of a high Q (Quality factor) is used, only the single frequency component cannot be extracted from the detected waveform. This is because since the single frequency component is merely falsely extracted, particularly, when the drive waveform is formed in the 1-pulse drive, the input response characteristics of the electric filter like a band pass filter is easily influenced by a frequency distribution of a detected waveform before filtering.

Therefore, the controller 1 of the embodiment detects each vibration by the drive waveform including a plurality of pulses of different numbers of times formed by the vibrator driver 2 and calculates the coordinates for each detected waveform by using the detection waveforms which are respectively detected.

<Explanation of detection of the vibration propagation time>

A principle for measuring the vibration arrival time up to the vibration sensor will now be described hereinbelow.

Figure 12A:
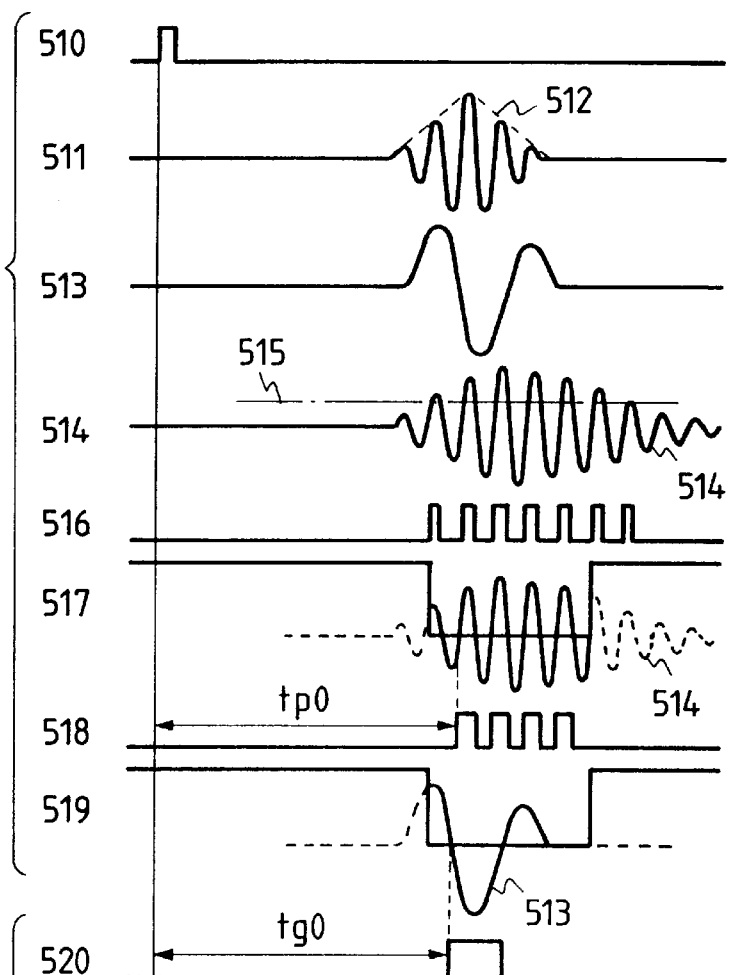
FIG. 12A is a timing chart when a drive waveform by the 1-pulse drive is inputted to a vibration waveform detector 9.
Figure 12B:
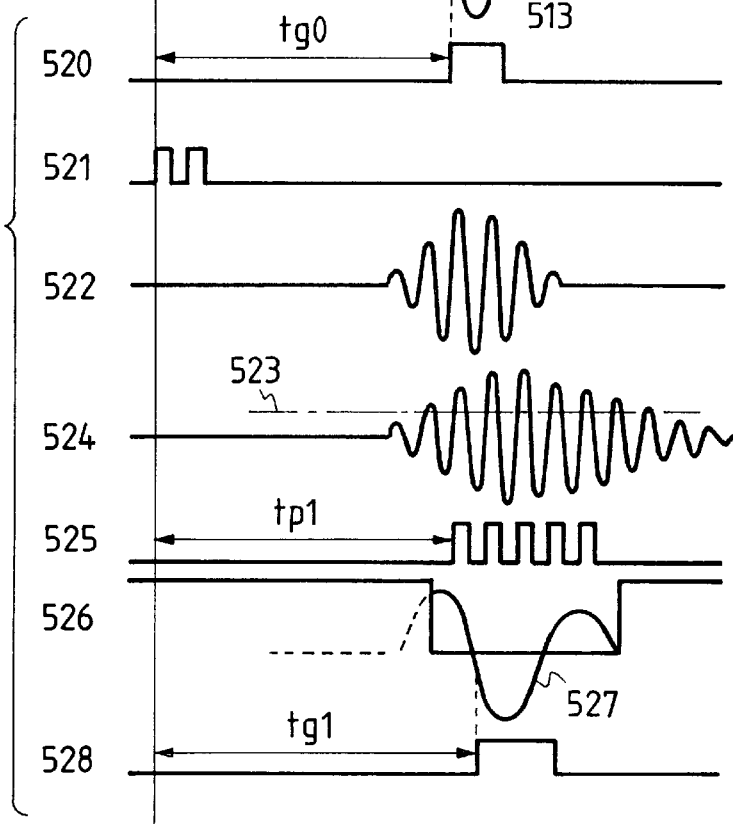
FIG. 12B is a timing chart when a drive waveform by the 2-pulse drive is inputted to the vibration waveform detector 9.

FIG. 12A shows a timing chart when the drive waveform by the 1-pulse drive is inputted to the waveform detector 9. FIG. 12B shows a timing chart when the waveform by the 2-pulse drive is inputted to the waveform detector 9.

Although the case of the vibration sensor 6a will be described hereinbelow, the same shall also apply to the cases of the other vibration sensors 6b, 6c, and 6d.

The measurement of the vibration propagation time to the vibration sensor 6a is started simultaneously with the output of a start signal to the vibrator driver 2. First, in case of the 1-pulse drive, the drive signal 510 is applied from the vibrator driver 2 to the vibrator 4. In case of the 2-pulse drive, the drive signal 521 is applied. The supersonic vibrations propagated from the vibration input pen 3 to the vibration propagating plate 8 by the drive signals 510 and 521 progress at propagating velocities according to the frequencies with a time corresponding to the distance to the vibration sensor 6a. After that, it is detected by the vibration sensor 6a.

The measurement of the vibration propagation time of the vibration to the vibration sensor 6a is started in response to a leading edge of the drive signal 510. The controller 1 generates a drive signal to the vibrator 4 from the vibrator driver 2 of the vibration input pen 3. By the drive signal, the vibration input pen 3 vibrates. The vibration from the vibration input pen 3 is delayed by a time corresponding to the distance to the vibration sensor 6a through the vibration propagating plate 8 and is detected by the vibration sensor 6a.

In FIG. 12A, the signal (phase waveform signal) shown at 511 indicates the signal waveform detected by the vibration sensor 6a. Since the vibration in this case is a plate wave, the relation between the phase waveform signal 511 and the envelope 512 obtained by passing the detected waveform through the envelope detector for the propagation distance in the vibration propagating plate 8 changes during the vibration propagation in accordance with the propagation distance. The double differentiation waveform 513 is obtained by differentiating the envelope 512 twice through the double differentiator. The window signal 519 which gives a predetermined period after the envelope 512 exceeded a predetermined level is formed and the double differentiation waveform 513 is masked. A zero-cross point of the double differentiation waveform 513 after the envelope 512 exceeded the predetermined level is detected, thereby forming the signal 520 as a delay time detection signal. It is now assumed that a time from the leading edge of the signal 510 to the leading edge of the signal 520 is set to tg0.

In order to decide the coordinates at a further high precision, a process based on the detection of the phase waveform signal 511 is performed. The signal 514 is obtained by eliminating the surplus frequency component in the phase waveform signal 511 by a band pass filter. The pulse signal 516 of a portion in which the signal 514 exceeds the threshold value 515 at the predetermined level is formed, thereby forming the window signal 517 having a predetermined width in which the first pulse of the pulse signal 516 is set to a start point. The signal 514 is masked by the window signal 517 and is pulse converted, thereby forming the signal 518. A time from the leading edge of the signal 510 to the leading edge of the signal 518 is set to tp0.

Similarly, in FIG. 12B, the time tg1 from the leading edge of the drive signal 521 to the leading edge of the signal 528 and the time tp1 from the leading edge of the drive signal 521 to the leading edge of the signal 525 are obtained.

The controller 1 calculates the distances which are obtained from the drive waveforms 510 and 521 by the above calculating equations (1) and (2) by using the times tg0, tp0, tg1, and tp1 corresponding to the drive waveforms 510 and 521 obtained. From the calculation results, the distance values which are derived by the two kinds of drive signals are compared, respectively, thereby judging whether the distance calculation error of "n" by the equation (3) mentioned above is large or not.

Upon calculation of the distances, the tg value and tp value at a predetermined distance (for example, when the vibration input pen 3 is located at the center of the input surface) are set to tginit and tpinit and are previously held in the controller 1. Differential distances are obtained from differences between tginit and tpinit and the values of tg and tp at the time of the input from the vibration input pen 3, thereby calculating the coordinates (the details are shown in Japanese Patent Publication No. 5-62771).

When the numbers of drive pulses to be generated differ, even at the same distance (distance between the vibration input pen 3 and the vibration sensor 6), the values of tg and tp which are detected change. Therefore, it is necessary to hold the values of tginit and tpinit every number of drive pulses to be generated, respectively.

In order to calculate one distance, the driving operations by the two kinds of drive signals have to be sequentially executed. However, in case of a high speed controller 1, a sampling rate of the coordinates input apparatus doesn't cause a problem.

<Explanation of difference between performances of the number of drive pulses to be generated>

The number of times of the generation of the drive waveform and a feature of the drive waveforms will now be described. The cases of the 1-pulse drive and 2-pulse drive will now be described here in particular.

Figure 13:
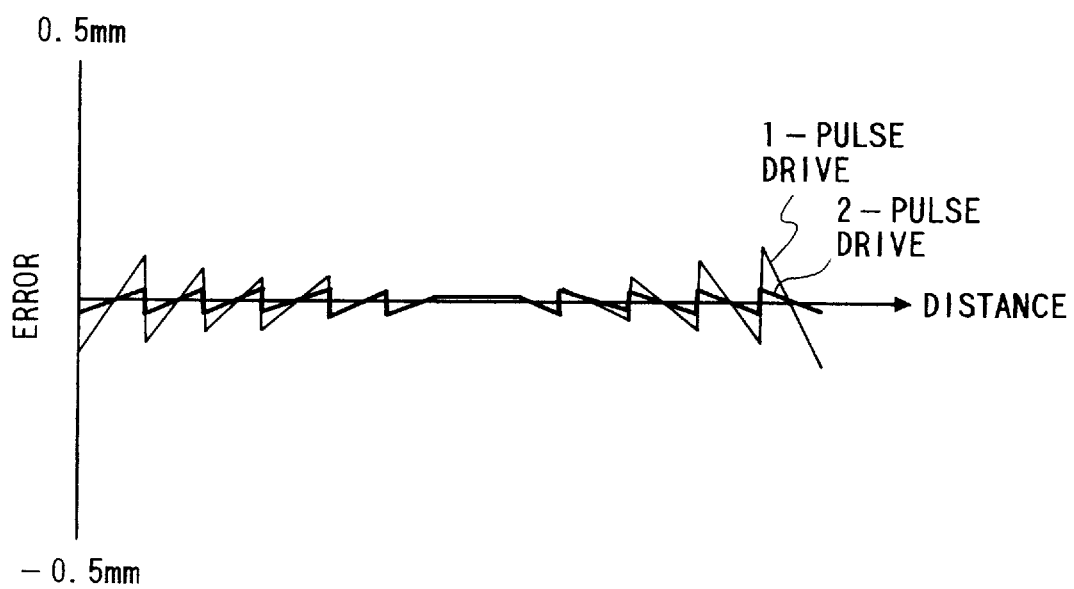
FIG. 13 is a diagram showing the relation between the number of times of the generation of a drive waveform and a distance error in the embodiment.

FIG. 13 is a diagram showing the relation between the number of times of the generation of the drive waveform and the distance error.

As the number of times of the generation of the drive waveform is small, the vibration to be generated is a wide band vibration. Therefore, when the relative position from the whole waveform at the tp detection point moves in accordance with the measurement distance, a change amount of the frequency near the detection point increases. That is, at a near distance, a behavior (phase delay time) of the vibration of a low frequency is detected. At a far distance, a behavior of the vibration of a high frequency is detected. Therefore, when calculating by using a predetermined sound velocity value, an error as shown in the diagram is included. Since a band in the 1-pulse drive is wider than that in the 2-pulse drive, a measurement distance error is large.

However, as mentioned above, a time width of the detection waveform of the vibration sensor in the case where the number of times of the generation of the drive waveform is smaller is shorter and a time resolution is higher. Therefore, the absolute value of a fluctuation (error fluctuation) of tg is small. On the other hand, since it is more difficult to be influenced by an overlap of the reflected wave, a possibility such that "n" is erroneously calculated is small. Namely, as shown in FIG. 13, although the calculation distance error when "n" is correctly calculated is large, there is an advantage such that it is difficult to generate a large "n"-error due to the calculation error of "n".

On the other hand, in the 2-pulse drive, a band of the vibration to be generated is narrow and the measurement distance error decreases. However, the time width of the detected waveform of the vibration sensor is long. Since it is more largely influenced by the overlap of the reflected wave rather than the case of the 1-pulse drive, a possibility such that "n" is erroneously calculated increases.

In the embodiment, therefore, when the "n"-error is judged, "n" is calculated by using the data in the 1-pulse drive and the data in the 2-pulse drive is used as for a value of the distance to be actually calculated. It is assumed that there is executed a control such that when the vibration input pen 3 is come into contact with the vibration propagating plate 8, the vibrator driver 2 generates the drive waveform by the 1-pulse drive and, after that, generates the drive waveform by the 2-pulse drive.

A processing flow in the embodiment will now be described with reference to a flowchart of FIG. 14.

Figure 14:
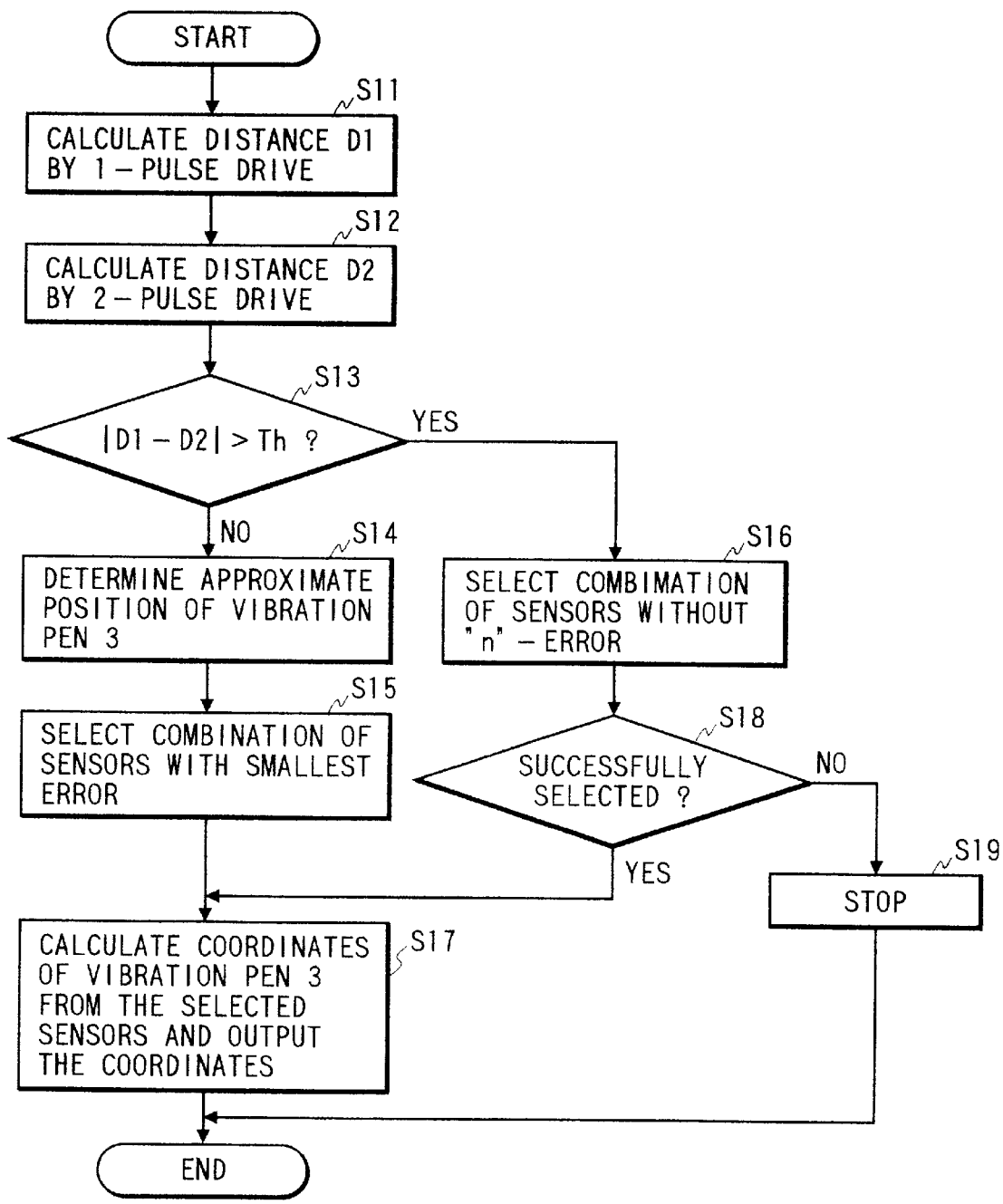
FIG. 14 is a flowchart showing a processing flow according to the embodiment.

FIG. 14 is the flowchart showing the processing flow of the embodiment.

The details of the time detecting process when the coordinate position is calculated are omitted because they are similar to those of the foregoing processes.

In step S11, each time data until the vibration from the vibration input pen 3 by the drive waveform in the 1-pulse drive is detected by the vibration sensors 6a to 6d is obtained, thereby calculating a distance D1 between each of the vibration sensors 6a to 6d and the vibration input pen. In step S12, each time data until the vibration from the vibration input pen 3 by the drive waveform in the 2-pulse drive is detected by each of the vibration sensors 6a to 6d is obtained, thereby calculating a distance D2 between each of the vibration sensors 6a to 6d and the vibration input pen.

In step S13, differences between the calculated distances obtained in the 1-pulse drive and the 2-pulse drive are obtained every vibration sensors 6a to 6d. Whether a difference between the calculated distances D1 and D2 is larger than a predetermined threshold value Th or not is judged. The predetermined threshold value Th is set to an enough large value (about a few mm) such as not to present the difference so long as "n" is not erroneously calculated.

When there is an "n"-error in any one of the vibration sensors 6a to 6d, namely, when the difference between the calculated distances is larger than the predetermined threshold value (YES in step S13), step S16 follows. When the difference between the calculated distances corresponding to each of the vibration sensors 6a to 6d is equal to or smaller than the predetermined threshold value (NO in step S13), step S14 follows.

In step S14, a process to judge an approximate position of the vibration input pen 3 is executed. In the judgment of the approximate position, for areas obtained by largely dividing the vibration propagating plate 8, whether the coordinates are located in any one of the dividing areas is judged. When the area where the coordinates are located is discriminated, step S15 follows. In step S15, a combination of the adjacent ones of the vibration sensors 6a to 6d such that the coordinate calculation error is smallest with respect to such a discriminated area is selected. As a selecting method, for example, a combination of the vibration sensors 6a to 6d in which an influence by the reflected wave from the edge surface of the vibration propagating plate 8 is small as disclosed in Japanese Patent Application No. 4-233298 (Japanese Patent Application Laid-Open No. 6-83520) is selected.

In step S16, a combination of the adjacent ones of the vibration sensors 6a to 6d without an "n"-error is selected. In step S17, a check is made to see if such a combination could be selected. When the combination of the adjacent vibration sensors without an "n"-error is selected (YES in step S18), step S17 follows. When a combination of the adjacent vibration sensors without an "n"-error is not selected (NO in step S18), step S19 follows. In step S19, an output of the coordinates instructed by the vibration input pen 3 is stopped. It is known by experience that there is one or at most two vibration sensors having an "n"-error and a situation such that the number of sensors necessary for calculation of the coordinates cannot be obtained and the output of the coordinates is stopped because the number of vibration sensors having an "n"-error is large is a rare case.

In step S17, the coordinate position designated by the vibration input pen 3 is calculated on the basis of the distance information by the 2-pulse drive of the selected adjacent vibration sensors and the coordinates are outputted.

The number of combinations of the adjacent vibration sensors to be selected is not limited to one. So long as at least one set of adjacent two vibration sensors exists (for example, the vibration sensors 6a and 6b in FIG. 1), the coordinates instructed by the vibration input pen 3 can be calculated. However, when there are two or more sets of adjacent vibration sensors, a precision in the calculation of the coordinates in each set is better. In such a case, therefore, the coordinates can be also calculated at a higher precision by using the coordinates which are calculated every set.

According to the embodiment as mentioned above, the vibrations by the drive waveforms in the 1-pulse drive and the 2-pulse drive are detected by the vibration sensors, thereby obtaining a difference between the distances which are calculated in the 1-pulse drive and the 2-pulse drive every vibration sensor. When the difference between the distances calculated by each vibration sensor is equal to or smaller than a predetermined threshold value, it is judged that there is no "n"-error. At least one set of adjacent vibration sensors with the smallest distance difference is selected and the coordinates are outputted. Thus, the coordinate position can be outputted at a higher precision by at least one set of the adjacent vibration sensors. On the other hand, when any one of the distance differences calculated by the vibration sensors is larger than the predetermined threshold value, at least one set of the adjacent vibration sensors with the smallest distance difference is selected from the vibration sensors excluding the vibration sensor whose distance difference is larger than the predetermined threshold value and the coordinates are outputted, so that the coordinate position can be outputted at a higher precision.

Different from the conventional method of calculating the coordinate position by a combination of the distance information of at least three or more of a plurality of vibration sensors, the coordinate position can be calculated by using at least one set of the adjacent vibration sensors. Therefore, the limitation of the arrangement of the vibration sensors is lightened and the apparatus can be designed with a high degree of freedom.

Although the embodiment has four vibration sensors, two vibration sensors can be also used in place of them. When using two vibration sensors, if an an "n"-error occurs, the output of the coordinates can be also stopped.

The invention can be applied to a system constructed by a plurality of equipment such as "host computer, interface, printer, etc." or to an apparatus comprising one equipment. It will be obviously understood that the invention can be also applied to a case where the invention is embodied by supplying a program to a system or an apparatus. In such a case, a memory medium in which the programs according to the invention have been stored constructs the invention. By reading out the programs from the memory medium and supplying to the system or apparatus, the system or apparatus operates by a predetermined method.

As will be also obviously understood from the above description, according to the invention, the coordinates input apparatus and method which can accurately calculate the coordinate position by using two vibration sensors can be provided.

What is claimed is:

1. A coordinate input apparatus for inputting coordinates by applying a vibration to a vibration propagating plate, comprising:

vibration input means for inputting a plurality of vibrations having different frequencies that can be separately detected at a certain position on the vibration propagating plate;

vibration detecting means comprising a plurality of sensors arranged at predetermined positions, each for detecting the plurality of vibrations input by said vibration input means and propagated on the vibration propagating plate;

vibration propagation distance calculating means for calculating vibration propagation distances for each of the plurality of vibrations, from vibration propagation times from the input of the vibration by said vibration input means to the detection of the vibration by the plurality of sensors;

error determination means for comparing the vibration propagation distances calculated by said vibration propagation distance calculating means between the plurality of vibrations so as to determine presence or absence of a wavelength error;

distance determination means for correcting the wavelength error if said error determination means determines presence of the wavelength error, and based on the error correction, determining distances from the certain position to the plurality of sensors; and input position calculating means for calculating the certain position from the distances determined by said distance determination means.

2. An apparatus according to claim 1, wherein, when each vibration propagation distance calculated with respect to the vibration of each frequency coincides, said distance determination means sets the vibration propagation distance to the distance from the input position to the sensor.

3. An apparatus according to claim 2, wherein said distance determination means further has vibration propagation distance correcting means for correcting the vibration propagation distance on the basis of comparison results when each vibration propagation distance calculated with respect to the vibration of each frequency does not coincide, and for setting the corrected vibration propagation distance to the distance from the input position to the sensor.

4. An apparatus according to claim 3, wherein said vibration propagation distance correcting means corrects an error regarding a wavelength included in the vibration propagation distance on the basis of a difference between the vibration propagation distances calculated with respect to the vibration of each frequency.

5. A coordinates input method of inputting coordinates by applying a vibration to a vibration propagating plate, comprising the steps of:

inputting a plurality of vibrations having different frequencies that can be separately detected at a certain position on the vibration propagating plate;

detecting, by a plurality of sensors, the plurality of vibrations input and propagated on the vibration propagating plate;

calculating the vibration propagation distances for each of the plurality of vibrations by vibration propagation times from the input of the vibration to the detection of the vibration by the sensor;

determining distances for correcting the wavelength error if a wavelength error is determined to be present, and based on the error correction, determining distances from the certain position of the vibration to the plurality of sensors; and calculating the certain position of the vibration from each of the determined distances.

6. A method according to claim 5, wherein, when each vibration propagation distance calculated with respect to the vibration of each frequency coincides, the distance determination means sets the vibration propagation distance to the distance from the input position to the sensor.

7. A method according to claim 6, wherein the distance determination means corrects the vibration propagation distance on the basis of comparison results when each vibration propagation distance calculated with respect to the vibration of each frequency does not coincide, and sets the corrected vibration propagation distance to the distance from the input position to the sensor.

8. A method according to claim 7, wherein the vibration propagation distance correcting means corrects an error regarding a wavelength included in the vibration propagation distance on the basis of a difference between the vibration propagation distances calculated with respect to the vibration of each frequency.

* * * * *

UNITED STATES PATENT AND TRADEMARK OFFICE
CERTIFICATE OF CORRECTION

PATENT NO. : 5,818,429

DATED : October 6, 1998

INVENTOR(S) : ATSUSHI TANAKA ET AL.

Page 1 of 2

It is certified that error appears in the above-identified patent and that said Letters Patent is hereby corrected as shown below:

SHEET 13, FIGURE 14

"COMBIMATION" should read --COMBINATION--.

COLUMN 1

Line 61, "is" should read --are--.

COLUMN 3

Line 46, "is" should read --are--.

COLUMN 6

Line 53, "circuits 9'" should read --circuits 9',--.

COLUMN 8

Line 47, "watch doc" should read --watchdog--.

COLUMN 9

Line 27, "s" should read --is--.

UNITED STATES PATENT AND TRADEMARK OFFICE
CERTIFICATE OF CORRECTION

PATENT NO. : 5,818,429

DATED : October 6, 1998

INVENTOR(S) : ATSUSHI TANAKA ET. AL.

It is certified that error appears in the above-identified patent and that said Letters Patent is hereby corrected as shown below:

COLUMN 13

Line 43, "and to drive." should be deleted.
    Line 49, "detects." should read --detects it--.
    Line 56, "show" should read --shown--.

COLUMN 16

Line 57, "an enough" should read --a sufficiently--.

Signed and Sealed this

Thirty-first Day of August, 1999

Attest:

Q. TODD DICKINSON

*Attesting Officer*     *Acting Commissioner of Patents and Trademarks*